Patented Nov. 2, 1937

2,097,517

UNITED STATES PATENT OFFICE 2,097,517

SOLUBLE HYPOCHLORITE COMPOSITION

Charles B. Durgin, Anniston, Ala., assignor, by mesne assignments, to Monsanto Chemical Company, a corporation of Delaware No Drawing. Application November 23, 1932, Serial No. 644,079

28 Claims. (Cl. 87—5)

This invention relates to a new hypochlorite composition of matter, and further relates to a hypochlorite composition which is completely water-soluble in alkaline solutions such as would be obtained by the presence of soaps or other alkaline detergents in solution.

Bleaching powder, consisting of a mixture of calcium hypochlorite and calcium chloride, and also the purer forms of calcium hypochlorite as well as the various double and triple salts of calcium hypochlorite and sodium hypochlorite, such as the compound $$Ca(OCl)_2.NaOCl.NaCl.12H_2O$$

have been long used for the preparation of disinfecting and bleaching solutions. However, most—if not all—of these bodies contain calcium which, if not insoluble, is present in such a form, in solution as to react with soaps, forming the corresponding insoluble compounds. It was consequently difficult, if not impossible, to use these calcium or other alkaline earth metal hypochlorites in a detergent containing soap or trisodium phosphate, because of the large bulk of precipitate formed. The formation of this precipitate is an important deterrent in the use of these hypochlorites in laundry and dairy bleaching or disinfecting operations, making such alkaline earth metal hypochlorites of limited value. In order to overcome this objection it has been proposed to effect the formation of lime-free sodium hypochlorite solutions by double decomposition of a pure calcium hypochlorite with soda ash or sodium sulphate, this reaction being carried out as a separate and distinct operation. In order to facilitate this operation, preparations containing both the pure calcium hypochlorite and either soda ash or sodium sulphate have been produced. It has also been proposed to make mixtures of calcium hypochlorite or bleaching powder and alkali metal salts of acids that will form soluble salts with the calcium present in the hypochlorite.

In the first of these proposals a separate operation is necessary, involving solution and decantation of the precipitate formed, which may be undesirable or inconvenient; while in the second case, altho the calcium is rendered water-soluble, it would be difficult, if not impossible, to use such soluble calcium containing solutions in combination with soap or in alkaline solution, because of the formation of the well known insoluble calcium soaps. In this connection it has been recommended that a small proportion of an acid be employed in order to obtain complete solubility. Such addition is undesirable because of the well-known instability of the hypochlorite in acid solutions.

I have now discovered a hypochlorite composition which is completely soluble in alkaline as well as acid solutions and which, furthermore, may be employed in alkaline hard-water solutions without the formation of a precipitate therein, and which may accordingly be employed in combination with the known alkaline detergents. I have discovered that if alkali metal metaphosphates or mixtures of such metaphosphates and pyrophosphates are mixed with hypochlorites containing alkaline earth metals such as calcium or magnesium or with other hypochlorites, either solid or in solution, which it is desired to employ in waters containing dissolved alkaline earth metal compounds, an improved hypochlorite composition is obtained which is capable of use in alkaline as well as in acid waters. My improved composition is preferably compounded with the ordinary bleaching powder or the purer forms of calcium hypochlorite now on the market or even with the triple salts containing alkali and alkaline earth metal hypochlorites in the molecule, altho alkali metal hypochlorites may also be used. By employing such a combination as will be hereinafter more fully set out, I have found that the alkaline earth metal present in the hypochlorite composition, or in the hard water, is rendered soluble in alkaline solutions, and furthermore is combined in such a form so that the ordinary soaps or other alkaline detergents are not decomposed or precipitated when used in such a solution. The advantage of a composition of this kind is obvious, since it makes possible the use of the readily available and cheap calcium hypochlorites, directly, with or without soap or other alkaline detergents and in hard or soft water without forming the precipitates which are usually difficult to remove and which consume soap by their formation.

Several examples are offered by way of illustration:—

Example I

The alkali metal metaphosphates which I employ should be, of course, the water-soluble varieties, and may be either the sodium, potassium, or even the lithium, caesium or rubidium metaphosphates. The sodium or potassium metaphosphates, being most easily prepared, are of course to be preferred and may be prepared in soluble form by the process described by Precht in British Patent 7,958 of 1892.

The alkali metal metaphosphate, as prepared by this method, is a glass-like amorphous solid and for the purpose of my invention may be crushed or ground in known manner to a fairly fine state of division. In order to obtain rapid solution of the metaphosphate, the material is ground to pass say a 50 mesh screen, but it is obvious that larger or smaller sizes may be employed.

In order to obtain one form of my improved hypochlorite composition, mix together three parts by weight of ground sodium metaphosphate and 1 part by weight of a stable dry powdered calcium hypochlorite containing minimum amounts of impurities, such, for example, as that produced by the method of U. S. Patent 1,481,039, and which will contain in the neighborhood of 59% available chlorine. My improved hypochlorite will then contain in the neighborhood of 15% available chlorine, and may be used in the usual way, after dissolving in water, for disinfecting and bleaching.

Example II

Mix together 10 parts of the stable calcium hypochlorite of U. S. Patent 1,481,035, 35 parts of anhydrous trisodium phosphate and 55 parts of a finely-ground sodium metaphosphate. This mixture will contain approximately 5.85% of available chlorine. Upon solution in water it may be employed for combined cleaning and disinfecting operations, and will not precipitate insoluble calcium phosphate from the solution. Other sodium phosphates or even soda ash or soap may be substituted in part for the trisodium phosphates, if desired.

Example III

In place of the calcium hypochlorite used in Examples I and II above, I may also employ the ordinary bleaching powder, such as contains 28% to 35% of available chlorine. In this case, by reason of the greater proportion of calcium present, I employ a somewhat greater amount of the metaphosphate in solution. A satisfactory composition will comprise 15 parts by weight of a bleaching powder containing 29% of available chlorine and 85 parts of sodium metaphosphate.

In all of the examples given above, in place of the alkali metaphosphates I may employ a mixture of alkali metal metaphosphates and alkali metal pyrophosphate. The advantage of thus employing a pyrophosphate together with the metaphosphate is that a more alkaline solution may be obtained than by the use of a metaphosphate alone. This is of particular advantage in the production of stable hypochlorite solutions, since it is known that such solutions are more stable when alkaline than when acid in character.

The following table gives the approximate hydrogen ion concentration (pH) of mixtures of sodium metaphosphate and sodium pyrophosphate:—

| Percent $Na_4P_2O_7$ | Percent $NaPO_3$ | pH of a 1% aqueous solution |
|---|---|---|
| 10 | 90 | 6.8 |
| 20 | 80 | 7.2 |
| 30 | 70 | 7.7 |
| 40 | 60 | 8.2 |
| 50 | 50 | 8.6 |
| 60 | 40 | 9.0 |
| 70 | 30 | 9.3 |
| 80 | 20 | 9.5 |
| 90 | 10 | 9.7 |

With the aid of the above table it will be possible for one skilled in the art to prepare solutions of varying alkalinity as may be desired. In general, it may be said that I have found the use of mixtures capable of yielding a pH of 7.0 to 7.5 in a 1% aqueous solution more satisfactory in preparing my hypochlorite compositions because then a greater proportion of the metaphosphate is present, which is more effective than the pyrophosphate in accomplishing the desired results of my invention, altho the latter is also effective and may be used in place of the metaphosphate. If a higher alkalinity is desired, it is preferable to obtain this by the use of another alkaline salt such as soda ash or trisodium phosphate.

For most purposes, it may be said that the proportion of metaphosphate used should be sufficient to yield at least three phosphorus atoms in the solution to one calcium or other alkaline earth metal atom and a higher proportion may be desirable. In case the pyrophosphate is used alone, the proportions should be at least 5 phosphorus atoms to 1 of calcium, and a higher proportion may be desirable. I have also noted that the proportion of phosphorus atoms to calcium atoms present in the solution will necessarily be higher when employing the more alkaline solutions whether such alkalinity is obtained by the use of pyrophosphate or by the use of another alkaline salt such as soda ash or trisodium phosphate. It is, however, possible in any case to obtain the desired complete solution by employing the ratios herein suggested or in case incomplete solubility is encountered, due to an excess of calcium or other alkaline earth metal in the solution, by adding an additional amount of the meta or the meta-pyrophosphate compound or both to the solution.

By way of further distinguishing my invention, I desire to point out that what I obtain is more than a simple solution of the calcium or other alkaline earth metal compounds in the presence of compounds which ordinarily will precipitate such bodies. I obtain what is equivalent to, and what behaves as, a soft water solution; that is, a water solution of hypochlorite which may contain dissolved calcium or magnesium compounds but which is capable of readily forming a lather with soaps.

It is accordingly possible to mix soap or soap powders or other alkaline detergents directly with the mixtures disclosed in the above examples, making thereby a complete water-soluble disinfecting and detergent composition. On the other hand, if such premixing of the detergent with the hypochlorite composition is not convenient or otherwise desirable, solutions of the hypochlorite may be separately prepared, after which these solutions may be combined with ordinary detergents. Such compositions as I have herein disclosed may be used with or without additional detergents and are especially valuable in hard waters, that is in waters containing calcium or magnesium compounds in solution.

Having described only three embodiments of my invention, it will be apparent, however, that my invention is not so limited but is susceptible to various changes and modifications without departing from the spirit thereof, and I desire that only those limitations be placed thereupon as may be imposed by the prior art or as are specifically set out in the appended claims.

What I claim is:

1. A hypochlorite composition comprising a substantially pure calcium hypochlorite 10 parts, trisodium phosphate 35 parts, and sodium metaphosphate 55 parts by weight.

2. A hypochlorite composition comprising an alkaline earth hypochlorite compound and an alkali metal metaphosphate, the metaphosphate being present in such proportion as to render the composition soluble in alkaline solutions.

3. A hypochlorite composition comprising an alkaline earth hypochlorite compound and an alkali metal metaphosphate, the metaphosphate being present in such proportions as to render the composition soluble in alkaline detergent solutions.

4. A hypochlorite composition comprising an alkaline earth hypochlorite compound and a mixture of alkali metal meta and pyrophosphates said mixture being present in such proportion as to render the composition soluble in alkaline solutions.

5. A hypochlorite composition comprising an alkaline earth metal hypochlorite compound and a mixture of alkali metal meta and pyrophosphates, the pyrophosphate being from 10 to 20 percent of said mixture, said mixture being present in such proportion as to render the composition soluble in alkaline solutions.

6. A hypochlorite composition comprising a calcium hypochlorite compound and a mixture of alkali metal metaphosphates, the metaphosphates being present in such proportion as to render the composition soluble in alkaline solution.

7. A hypochlorite composition comprising a calcium hypochlorite compound and sodium metaphosphate, the metaphosphate being present in such proportion as to render the hypochlorite soluble in alkaline solutions.

8. A hypochlorite composition comprising a calcium hypochlorite compound and a mixture of sodium meta and pyrophosphate, said mixture being present in such proportion as to render the composition soluble in alkaline solutions.

9. A hypochlorite composition comprising a calcium hypochlorite compound a mixture of a soluble sodium metaphosphate and sodium pyrophosphate, said sodium pyrophosphate being from 10 to 20 percent of said mixture and said mixture being present in such proportion as to render the composition soluble in alkaline solution.

10. A hypochlorite composition comprising a calcium hypochlorite compound, a soluble sodium metaphosphate and an alkaline detergent, said metaphosphate being present in such proportions as to render said composition soluble in aqueous solutions having a pH greater than 7.0.

11. A hypochlorite composition comprising a calcium hypochlorite compound, a soluble sodium metaphosphate and trisodium phosphate, said metaphosphate being present in such proportions as to render said composition soluble in aqueous solutions having a pH greater than 7.0.

12. A hypochlorite composition comprising a calcium hypochlorite compound, a soluble sodium metaphosphate and soap, said metaphosphate being present in such proportion as to render said composition soluble in aqueous solutions having a pH greater than 7.0.

13. A freely lathering hypochlorite solution having a pH greater than 7.0 and comprising a calcium hypochlorite compound and a soluble sodium metaphosphate.

14. A hypochlorite composition comprising an alkaline earth hypochlorite compound and an alkali metal pyrophosphate, the pyrophosphate being present in such proportion as to render the composition soluble in aqueous solutions having a pH greater than 7.0.

15. A freely lathering hypochlorite solution having a pH greater than 7.0 and comprising a calcium hypochlorite compound and a sodium pyrophosphate.

16. A bleaching and disinfecting composition comprising sodium metaphosphate and an alkaline-earth metal hypochlorite.

17. A bleaching and disinfecting composition comprising sodium metaphosphate and calcium hypochlorite.

18. A bleaching and disinfecting solution comprising an alkali-metal metaphosphate and a hypochlorite dissolved in a hard water.

19. The process of preparing a bleaching solution comprising dissolving an alkali metal metaphosphate and a hypochlorite in hard water.

20. The process of preparing a bleaching solution comprising dissolving an alkali metal metaphosphate and an alkaline earth metal hypochlorite in water.

21. A dry water-soluble chlorine compound comprising a difficultly soluble hypochlorite and a solubilizing agent for the same comprising a phosphate which yields soluble compounds of the cation of the hypochlorite on the alkaline side of neutrality in aqueous solution.

22. A dry water-soluble chlorine compound comprising an alkali earth metal hypochlorite and a solubilizing agent for the same comprising a phosphate which yields soluble compounds of the cation of the hypochlorite on the alkaline side of neutrality in aqueous solution.

23. A dry water-soluble chlorine compound comprising a difficultly soluble hypochlorite and a solubilizing agent for the same comprising an alkali metal phosphate which yields soluble compounds of the cation of the hypochlorite on the alkaline side of neutrality in aqueous solution.

24. A dry water-soluble chlorine compound comprising an alkali earth metal hypochlorite and a solubilizing agent for the same comprising an alkali metal phosphate which yields soluble compounds of the cation of the hypochlorite on the alkaline side of neutrality in aqueous solution.

25. A dry water-soluble chlorine compound comprising calcium hypochlorite and a solubilizing agent for the same comprising a phosphate which yields soluble compounds of the cation of the hypochlorite on the alkaline side of neutrality in aqueous solution.

26. A dry water-soluble chlorine compound comprising a difficultly soluble hypochlorite and a solubilizing agent for the same comprising sodium hexametaphosphate which yields soluble compounds of the cation of the hypochlorite on the alkaline side of neutrality in aqueous solution.

27. A dry water-soluble chlorine compound comprising calcium hypochlorite and a solubilizing agent for the same comprising sodium hexametaphosphate which yields soluble compounds of the cation of the hypochlorite on the alkaline side of neutrality in aqueous solution.

28. A dry water-soluble chlorine compound comprising a difficultly soluble hypochlorite and a solubilizing agent for the same comprising tetra sodium pyrophosphate which yields soluble compounds of the cation of the hypochlorite on the alkaline side of neutrality in aqueous solution.

CHARLES B. DURGIN.